United States Patent [19]

Shibata et al.

[11] Patent Number: 5,590,303
[45] Date of Patent: Dec. 31, 1996

[54] MEMORY DESIGNATION CONTROL DEVICE

[75] Inventors: Kouichi Shibata, Sakai; Shigenori Motooka, Nishinomiya, both of Japan

[73] Assignee: Mita Industrial Co., Ltd., Japan

[21] Appl. No.: 974,103

[22] Filed: Nov. 10, 1992

[30] Foreign Application Priority Data

Nov. 13, 1991 [JP] Japan .................................. 3-326328

[51] Int. Cl.⁶ ............................ G06F 12/00; G06F 12/02; G11C 16/06
[52] U.S. Cl. .................. 395/427; 395/430; 364/DIG. 1; 364/DIG. 7; 365/185.33
[58] Field of Search ..................... 395/425, 750, 395/575, 427, 430, 186; 364/965.76, 852, DIG. 1, DIG. 2; 371/10.1, 66; 365/200, 900, 189.29, 185.33

[56] References Cited

U.S. PATENT DOCUMENTS

| | | | |
|---|---|---|---|
| 4,204,252 | 5/1980 | Hitz et al. | 395/775 |
| 4,327,410 | 4/1982 | Patel et al. | 395/425 |
| 4,517,663 | 5/1985 | Imazeki et al. | 365/222 |
| 5,053,797 | 10/1991 | Samuels et al. | 354/322 |
| 5,132,716 | 7/1992 | Samuels et al. | 354/322 |
| 5,245,572 | 9/1993 | Kosonocky et al. | 365/189.02 |
| 5,361,343 | 11/1994 | Kosonocky et al. | 395/425 |

FOREIGN PATENT DOCUMENTS 2201816  9/1988  United Kingdom.

OTHER PUBLICATIONS

Houdek and Slack, "Auto Initial Microprogram Load", *IBM Technical Disclosure Bulletin*, vol. 19, No. 11, Apr. 1977, New York, U.S., pp. 4339–4346.

Patzer, "Flexible Read–Only Read/Write Memory Partition", *IBM Technical Disclosure Bulletin*, vol. 15, No. 8, Jan. 1973, New York, U.S., pp. 2397–2398.

"Circuitry for a Self–Programming OTP–EPROM Based Microcontroller System", *Reasearch Disclosure*, No. 308, Dec. 1989, Havant, GB, pp. 9531–9532.

*Primary Examiner*—Tod R. Swann
*Assistant Examiner*—Tuan V. Thai
*Attorney, Agent, or Firm*—Beveridge, DeGrandi, Weilacher & Young, L.L.P.

[57] ABSTRACT

A memory designation control device having a rewriting program for rewriting the contents of a first memory device storing a basic program stored in a second memory device different from the first memory device. When the system power supply is turned on when a normal processing mode is selected, only the first memory device out of the first memory device and the second memory device is brought into a selectable state. Consequently, in the normal processing mode, normal processing is executed on the basis of the basic program. When the system power supply is turned on when a rewrite processing mode is selected, only the second memory device out of the first memory device and the second memory device is brought into a selectable state at the time of a read instruction, while only the first memory device out of the first memory device and the second memory device is brought into a selectable state at the time of a write instruction. Consequently, in the rewrite processing mode, rewrite processing is executed on the basis of the rewriting program.

5 Claims, 4 Drawing Sheets

MEMORY DESIGNATION CONTROL DEVICE

BACKGROUND OF THE INVENTION

1. Field of the Invention

The present invention relates to a memory designation control device used in a printer system or the like.

2. Description of the Prior Art

In recent years, in printer systems and the like, a basic program has been stored in a rewritable ROM (Read Only Memory) such as an EEPROM (Electrically Erasable Programmable Read Only Memory) or a flash EEPROM (Flash Electrically Erasable Programmable Read Only Memory), and the basic program has been rewritten without replacing the memory devices. The basic program is typically rewritten on the basis of a rewriting program other than the basic program.

An attempt to store the rewriting program in the same rewritable ROM storing the basic program and then rewriting the basic program with the rewriting program causes not only the basic program but also the rewriting program to be rewritten, so that the program is corrupted. Furthermore, in the flash EEPROM, in rewriting the contents thereof, all the contents are erased at the same time. Accordingly, the rewriting program is stored in a memory device such as an EPROM (Erasable Programmable Read Only Memory) different from the rewritable ROM storing the basic program. Addresses different from those assigned to the rewritable ROM storing the basic program are assigned to the memory device storing the rewriting program.

In the above described conventional system, if the power supply is turned off while the basic program stored in the rewritable ROM is being rewritten, processing based on an incomplete basic program which is rewritten only halfway is started next time the power supply is turned on. Therefore, the system does not operate normally.

An object of the present invention is to provide a memory designation control device capable of normally operating a system, even if the power supply is turned off while the contents of a rewritable ROM are being rewritten, when the system is subsequently operated.

SUMMARY OF THE INVENTION

A first memory designation control device according to the present invention is characterized by comprising a first rewritable memory device for storing a basic program, a second memory device different from the first memory device for storing a rewriting program for rewriting the contents of the first memory device, and a mode selecting switch for switching between a normal processing mode in which normal processing based on the basic program is performed and a rewrite processing mode in which rewrite processing based on the rewriting program is performed. The device also has means for bringing only the first memory device, out of the first memory device and the second memory device, into a selectable state when the system power supply is turned on in a case where the on-off state of the mode selecting switch is a state where the normal processing mode is selected, and means for bringing only the second memory device, out of the first memory device and the second memory device, into a selectable state at the time of a read instruction, while bringing only the first memory device, out of the first memory device and the second memory device, into a selectable state at the time of a write instruction when the system power supply is turned on in a case where the on-off state of the mode selecting switch is a state where the rewrite processing mode is selected.

A rewritable ROM such as a flash EEPROM or an EEPROM is used as the above described first memory device.

An EPROM, for example, is used as the above described second memory device.

It is preferable to provide means for inhibiting, when the system power supply is turned on the above described mode selecting switch is in the state where the normal processing mode is selected, the above described second memory device from being brought into a selectable state when the mode selecting switch is switched to the rewrite processing mode.

Furthermore, the same addresses as those assigned to the above described first memory device may be assigned to the above described second memory device.

A second memory designation control device according to the present invention is characterized by comprising a first rewritable memory device for storing a basic program a second memory device different from the first memory device for storing a rewriting program for rewriting the contents of the first memory device, and a mode selecting switch for switching between a normal processing mode in which normal processing based on the basic program is performed and a rewrite processing mode in which rewrite processing based on the rewriting program is performed. The device also includes means for bringing only the first memory device, out of the first memory device and the second memory device, into a selectable state when the system power supply is turned on in a case where the on-off state of the mode selecting switch is set to a normal processing mode means for bringing only the second memory device, out of the first memory device and the second memory device, into a selectable state at the time of a read instruction, while bringing only the first memory device, out of the first memory device and the second memory device, into a selectable state at the time of a write instruction when the system power supply is turned on in a while the mode selecting switch is in a state where the rewrite processing mode is selected, and means for inhibiting when the system power supply is turned on while the mode selecting switch is in state where the normal processing mode is selected, the second memory device from being brought into a selectable state when the mode selecting switch is switched to the rewrite processing mode is selected after the system power supply is turned on.

A rewritable ROM such as a flash EEPROM or an EEPROM is used as the above described first memory device.

An EPROM, for example, is used as the above described second memory device.

Furthermore, the same addresses as those assigned to the above described first memory device may be assigned to the above described second memory device.

A third memory designation control device according to the present invention is characterized by comprising a first rewritable memory device for storing a basic program, a second memory device different from the first memory device for storing a rewriting program for rewriting the contents of the first memory device, and assigned the same addresses as those assigned to the first memory device, and a mode selecting switch for switching between a normal processing mode in which normal processing based on the basic program is performed and a rewrite processing mode in which rewrite processing based on the rewriting program is performed. The device also includes means for bringing only the first memory device, out of the first memory device and the second memory device, into a selectable state when the system power supply is turned on while the on-off state of the mode selecting switch is in a state where the normal processing mode is selected, and means for bringing only the second memory device, out of the first memory device and the second memory device, into a selectable state at the time of a read instruction, while bringing only the first memory device, out of the first memory device and the second memory device, into a selectable state at the time of a write instruction when the system power supply is turned on while the mode selecting switch is in a state where the rewrite processing mode is selected.

A rewritable ROM such as a flash EEPROM or an EEPROM is used as the above described first memory device.

An EPROM, for example, is used as the above described second memory device.

It is preferable to provide means for inhibiting, when the system power supply is turned on while the above described mode selecting switch is in the state where the normal processing mode is selected, the above described second memory device from being brought into a selectable state when the mode selecting switch is switched to the rewrite processing mode after the system power supply has been turned on.

In the first, second or third memory designation control devices according to the present invention, the rewriting program for rewriting the contents of the first memory device for storing the basic program is stored in a second memory device different from the first memory device. When the system power supply is turned on while the mode selecting switch is in the state where the normal processing mode is selected, only the first memory device out of the first memory device and the second memory device is brought into a selectable state. Consequently, in the normal processing mode, normal processing is executed on the basis of the basic program.

When the system power supply is turned on while the mode selecting switch is in the state where the rewrite processing mode is selected, only the second memory device, out of the first memory device and the second memory device, is brought into a selectable state at the time of the read instruction. Also, only the first memory device out of the first memory device and the second memory device is brought into a selectable state at the time of the write instruction. Consequently, in the rewrite processing mode, the rewrite processing is performed on the basis of the rewriting program.

In the first, second or third memory designation control device according to the present invention, when the power supply is turned off while the rewrite processing is being performed, the power supply is turned back on in a state where the mode selecting switch is set to the rewrite processing mode, to perform the rewrite processing from the beginning. Consequently, the basic program can be rewritten from the beginning without running an incomplete basic program, thereby making it possible to normally operate the system when the system is subsequently operated.

In the second memory designation control device according to the present invention, when the system power supply is turned on while the mode selecting switch is in the state where the normal processing mode is selected, the second memory device is inhibited from being brought into a selectable state when the mode selecting switch is then switched to the rewrite processing mode after the system power supply is turned on. Consequently, even if an operator erroneously switches the mode selecting switch while the normal processing mode is being executed, the rewriting program is not executed.

In the third memory designation control device according to the present invention, the same addresses as those assigned to the first memory device are assigned to the second memory device storing the rewriting program for rewriting the contents of the first memory device. Accordingly, even if the second memory device storing the rewriting program is provided, a memory area which is allowed to be designated by a system control device is not narrowed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
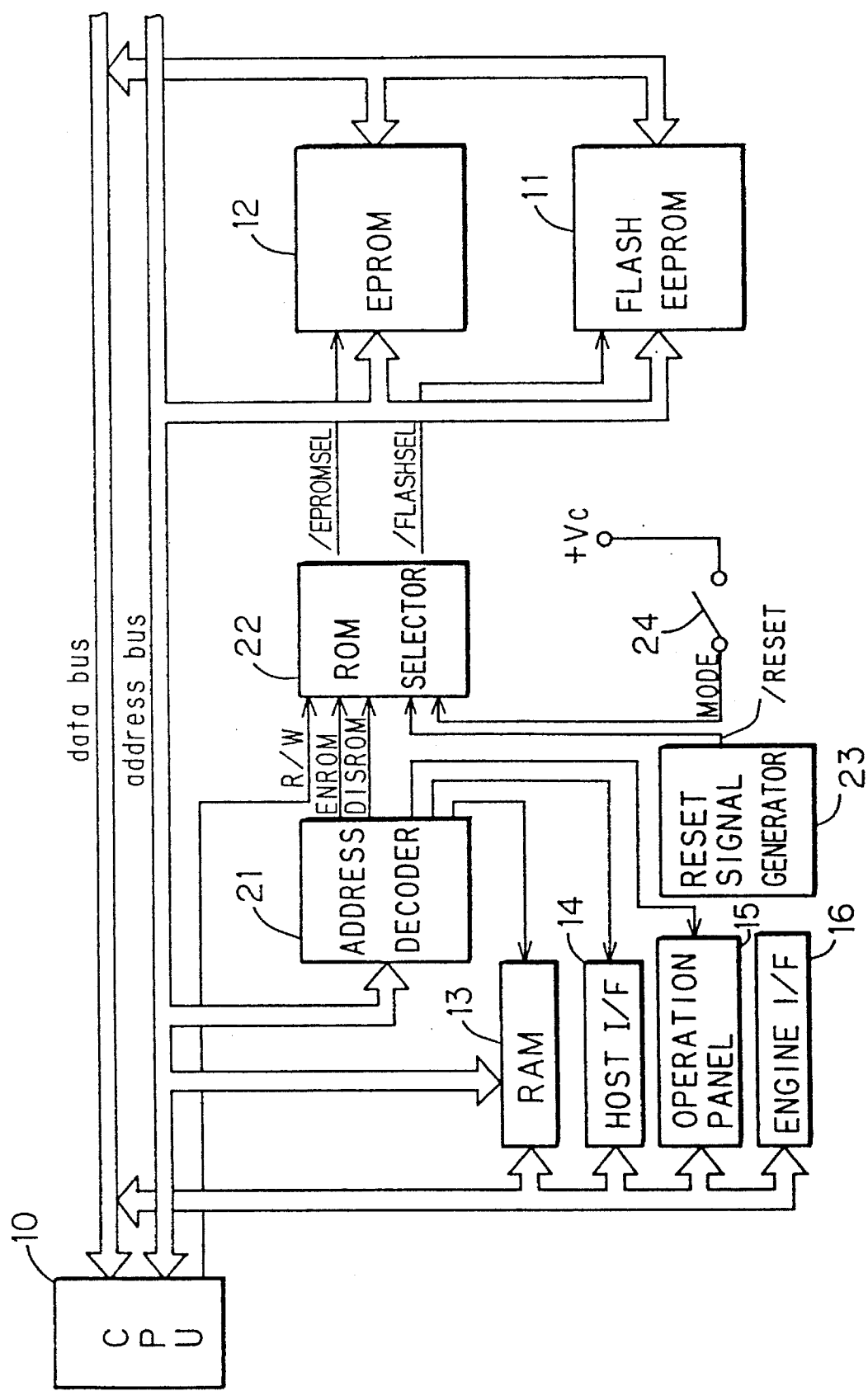
FIG. 1 is a block diagram showing the construction of a printer controller.

Referring now to the drawings, description is made of an embodiment in which the present invention is applied to a printer.

FIG. 1 shows a part of the construction of a printer controller.

The printer controller is controlled by a CPU (Central Processing Unit) 10. The CPU 10 comprises a flash EEPROM 11 storing a basic program or the like, an EPROM 12 storing a rewriting program for rewriting the contents of the flash EEPROM 11, and a RAM (Random Access Read Write Memory) 13 for storing necessary data. The same addresses are assigned to the flash EEPROM 11 and the EPROM 12.

The printer controller comprises, as input-output devices of the CPU 10, a host interface 14 to which a host computer is connected, an operation panel 15 having various operation keys, a display and the like, and a printer engine interface 16 to which a printer engine is connected. As a method of designating the input-output devices, the memory mapped method is used in this example. That is, it is the method is used of assigning addresses to each of the input-output devices and sending or receiving data to or from the input-output device as if the data were being read or written from or to a memory.

Memories such as the flash EEPROM 11, the EPROM 12, and the RAM 13 are connected to the CPU 10 through an address bus and a data bus. The input-output devices such as the host interface 14, the operation panel 15, and the printer engine interface 16 are connected to the CPU 10 through a data bus. A read/write signal R/W, which is not shown, is sent to each of the memories 11, 12 and 13 and the input-output devices from the CPU 10.

The printer controller comprises an address decoder 21 for decoding an address signal from the CPU 10 to generate designation signals of the ROMs 11 and 12, the RAM 13 and the input-output devices, and a ROM selector 22 for selecting the flash EEPROM 11 or the EPROM 12. The address decoder 21 is connected to the ROM selector 22, the RAM 13 and the input-output devices.

The same addresses are assigned to the flash EEPROM 11 and the EPROM 12. Accordingly, when an address signal for designating the ROMs 11 and 12 is output from the CPU 10, the same ROM designation signal ENROM is output from the address decoder 21. The ROM designation signal ENROM is sent to the ROM selector 22. A read/write signal R/W from the CPU 10, a rewrite processing inhibition signal DISROM from the address decoder 21, a reset signal /RESET from a reset signal generator 23, and a mode selection signal MODE from a rewrite mode selecting switch 24 are further input to the ROM selector 22.

The read/write signal R/W is brought to a high level at the time of a read instruction, and is brought into a low level at the time of a write instruction. The read/write signal R/W is always maintained at the high level. The reset signal generator 23 resets the respective equipment in the printer controller once when the power supply is turned on. The reset signal /RESET output from the reset signal generator 23 is at an active level "L" for a constant time period elapsed after the power supply is turned on and thereafter, is maintained at an inactive level "H".

The rewrite mode selecting switch 24 switches between a normal processing mode in which normal processing is performed on the basis of the basic program and a rewrite processing mode in which rewrite processing of the contents of the flash EEPROM 11 is performed on the basis of the rewriting program. When the rewrite processing mode is selected, an operator turns the power supply on in a state where the rewrite mode selecting switch 24 is turned on.

A flash EEPROM designation signal /FLASHSEL for selecting the flash EEPROM 11 or an EPROM designation signal /EPROMSEL for selecting the EPROM 12 is output from the ROM selector 22 in response to the input signal. The flash EEPROM designation signal /FLASHSEL and the EPROM designation signal /EPROMSEL are respectively input to a chip selecting input terminal of the flash EEPROM 11 and a chip selecting input terminal of the EPROM 12.

The rewrite processing inhibition signal DISROM is generated in the following manner. A data input instruction or a data output instruction for the input-output device (which is not actually used) is stored in a first area of the flash EEPROM 11. When the first address of the addresses assigned to the flash EEPROM 11 (which is the same as the first address of the addresses assigned to the EPROM 12) is designated from the CPU 10 after the power supply is turned on, the data input instruction or the data output instruction for the input-output device stored in the first area of the flash EEPROM 11 is read out if the normal processing mode is selected. Addresses assigned to the input-output device are designated. When an address signal for designating the addresses is input to the address decoder 21, a signal for designating the input-output device is output from the address decoder 21. This signal is used as the rewrite processing inhibition signal DISROM, to be input to the ROM selector 22.

Figure 2:
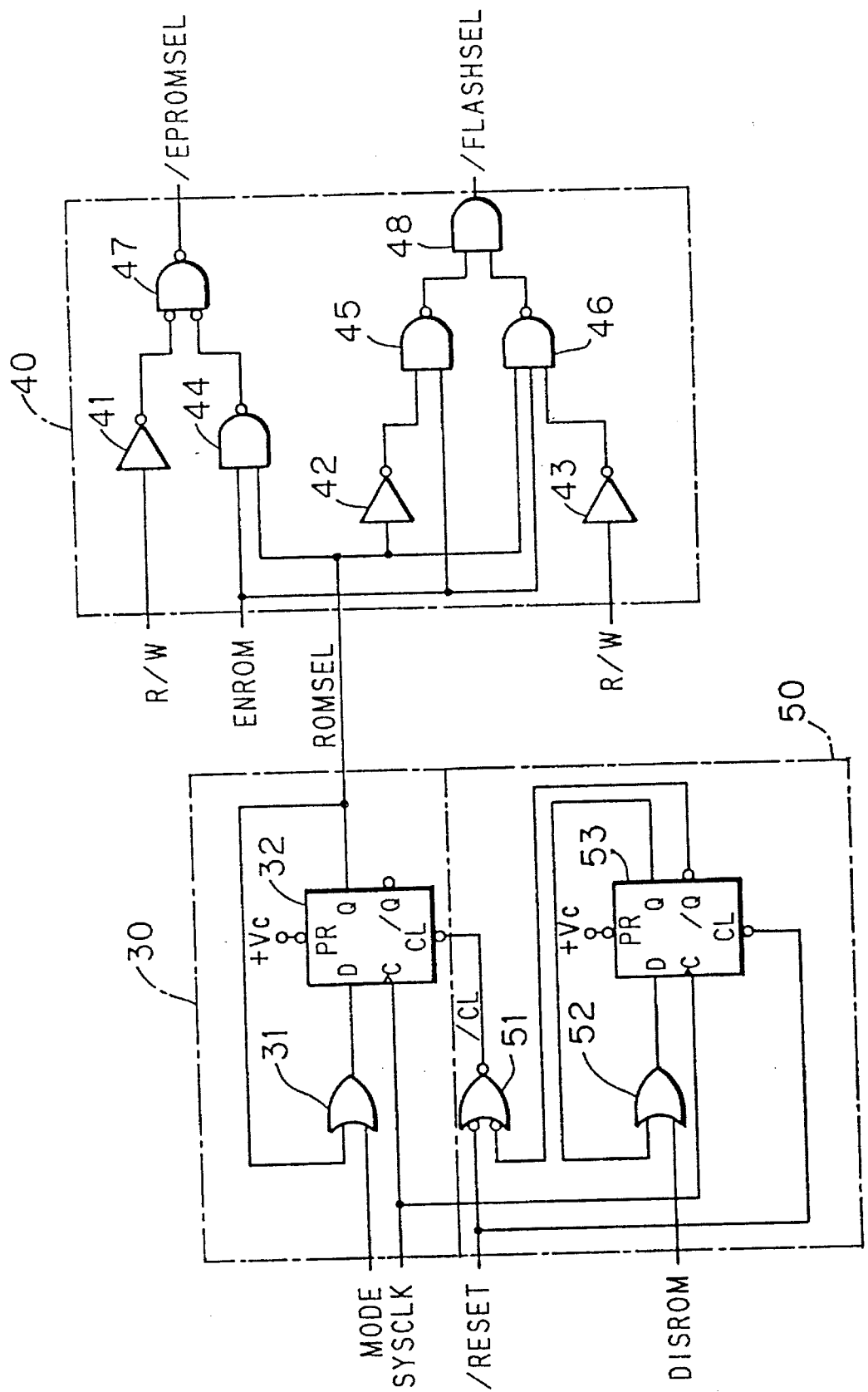
FIG. 2 is a circuit diagram showing the construction of a ROM selector.

FIG. 2 shows the construction of the ROM selector 22.

The ROM selector 22 comprises a mode discriminating circuit 30, a designation signal outputting circuit 40, and a write processing inhibiting circuit 50. The mode discriminating circuit 30 discriminates between processing modes on the basis of the mode selection signal MODE from the rewrite mode selecting switch 24 and a system clock SYSCLK, to output a mode distinction signal ROMSEL.

The designation signal outputting circuit 40 outputs the signal /FLASHSEL or /EPROMSEL for designating one of the flash EEPROM11 and the EPROM 12 on the basis of the mode distinction signal ROMSEL, the read/write signal R/W from the CPU 10, and a ROM designation signal ENROM from the address decoder 21.

The write processing inhibiting circuit 50 outputs a signal /CL for inhibiting the EPROM 12 from being designated even if the rewrite mode selecting switch 24 is turned on during normal processing, on the basis of the rewrite processing inhibition signal DISROM and the system clock SYSCLK in a case where the reset signal /RESET is at an inactive level "H".

The mode discriminating circuit 30 comprises an OR circuit 31 and a D-type flip-flop 32. The designation signal outputting circuit 40 comprises three inverters 41, 42 and 43, three NAND circuits 44, 45 and 46, and an circuit 47 and an AND circuit 48, having low active input-output terminals. The write processing inhibiting circuit 50 comprises an OR circuit 51 having low active input-output terminals an OR circuit 52 and a D-type flip-flop 53.

The mode selection signal MODE is input to one input terminal of the OR circuit 31 in the mode discriminating circuit 30. An output of the OR circuit 31 is input to a D input terminal of the D-type flip-flop 32. The mode distinction signal ROMSEL which is a Q output of the D-type flip-flop 32 is input to the other input terminal of the OR circuit 31.

The system clock SYSCLK is input to a clock input terminal C of the D-type flip-flop 32. A signal +Vc at an inactive level "H" is always input to a preset input terminal PR of the D-type flip-flop 32. An output signal /CL of the OR circuit 51 in the write processing inhibiting circuit 50 is input to a clear input terminal CL of the D-type flip-flop 32.

The rewrite processing inhibition signal DISROM is input to one input terminal of the OR circuit 52 in the write processing inhibiting circuit 50. An output of the OR circuit 52 is input to a D input terminal of the D-type flip-flop 53. A Q output of the D-type flip-flop 53 is input to the other input terminal of the OR circuit 52.

The system clock SYSCLK is input to a clock input terminal C of the D-type flip-flop 53. A signal +Vc at an inactive level "H" is always input to a preset input terminal PR of the D-type flip-flop 53. The reset signal /RESET is input to a clear input terminal CL of the D-type flip-flop 53. A /Q output of the D-type flip-flop 53 is input to one input terminal of the OR circuit 51. The reset signal /RESET is input to the other input terminal of the OR circuit 51.

The ROM designation signal ENROM and the mode distinction signal ROMSEL from the mode discriminating circuit 30 are input to the NAND circuit 44 in the designation signal outputting circuit 40. An inverted signal of the read/write signal R/W through the inverter 41 and an output signal of the NAND circuit 44 are inputted to the AND circuit 47.

Consequently, the EPROM designation signal /EPROMSEL, which is an output of the AND circuit 47, is brought into an active level "L" only when all of the mode distinction signal ROMSEL, the ROM designation signal ENROM and the read/write signal R/W are at a high level. That is, when the addresses assigned to the ROM 11 or 12 are designated in a case where the rewrite processing mode is selected and at the time of a read instruction, the EPROM 12 is designated.

The ROM designation signal ENROM and an inverted signal of the mode distinction signal ROMSEL through the inverter 42 are input to the NAND circuit 45 in the designation signal outputting circuit 40. The ROM designation signal ENROM, the mode distinction signal ROMSEL, and an inverted signal of the read/write signal R/W through the inverter 43 are input to the NAND circuit 46 in the designation signal outputting circuit 40. An output of the NAND circuit 45 and an output of the NAND circuit 46 are input to the AND circuit 48.

Consequently, the flash EEPROM designation signal /FLASHSEL, which is an output of the AND circuit 48, is brought into an active level "L" when the mode distinction signal ROMSEL is at a low level and the ROM designation signal ENROM is at a high level, or when both the mode distinction signal ROMSEL and the ROM designation signal ENROM are at a high level and the read/write signal R/W is at a low level. That is, when the addresses assigned to the ROM 11 or 12 are designated in a case where the normal processing mode is selected or when the addresses assigned to the ROM 11 or 12 are designated in a case where the rewrite processing mode is selected at the time of a write instruction, the flash EEPROM 11 is designated.

Figure 3:
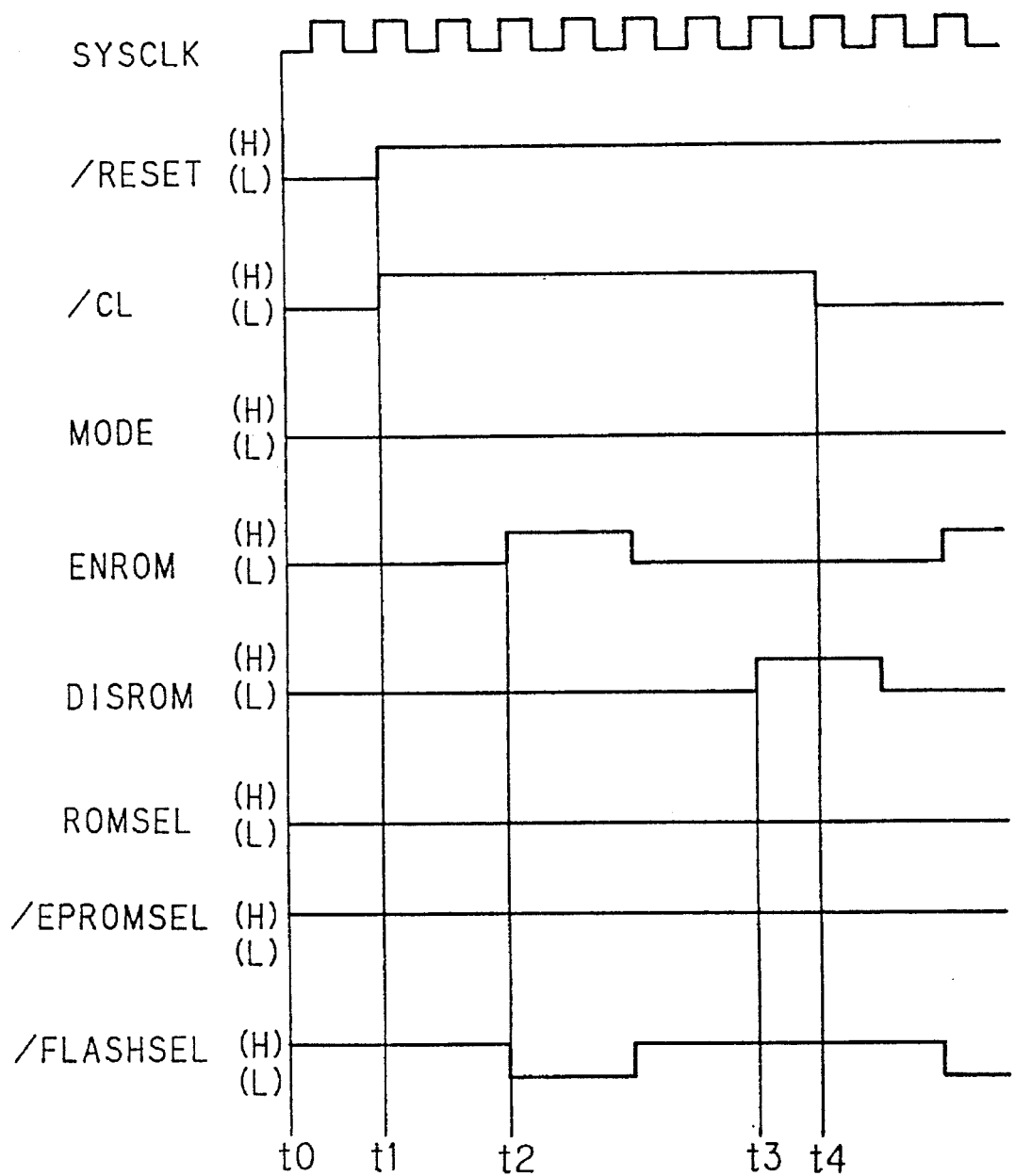
FIG. 3 is a timing chart showing signals in the respective portions shown in FIG. 2 in a normal processing mode.

FIG. 3 shows signals in the respective portions shown in FIG. 2 in the normal processing mode.

Referring to FIGS. 1, 2 and 3, description is made of an operation in the normal processing mode.

In the normal processing mode, when the system power supply is turned on (at the time point t0), the rewrite mode selecting switch 24 is not turned on, so that the mode selection signal MODE is at a low level. In addition, the reset signal /RESET from the reset signal generator 23 is at a low level. Accordingly, the input signal to the clear input terminal CL of each of the D-type flip-flops 32 and 53 is brought into a low level. Consequently, each of the D-type flip-flips 32 and 53 is cleared, so that the Q output is brought into a low level and the /Q output is brought into a high level.

Furthermore, since the ROM designation signal ENROM is at a low level, both the EPROM designation signal /EPROMSEL and the flash EEPROM designation signal /FLASHSEL are at an inactive level "H".

After a predetermined time period has elapsed since the system power supply was turned on (at the time point t1), the reset signal /RESET is reversed to enter an inactive level "H" and thereafter, this level is maintained. Consequently, the clear signal /CL which is the output of the OR circuit 51 is reversed to enter a high level, so that the cleared state of the D-type flip-flop 32 is released. In addition, the input signal to the clear input terminal CL of the D-type flip-flop 53 is brought into a high level, so that the cleared state of the D-type flip-flop 53 is also released. Even if the cleared state of the D-type flip-flop 32 is released, the rewrite mode selecting switch 24 is off, so that the mode distinction signal ROMSEL, which is the Q output of the D-type flip-flop 32, is maintained at a low level.

When the reset signal /RESET is reversed to enter the inactive level "H" so that reset is released at the above described time point t1, an address signal for designating the first address of the addresses assigned to the flash EEPROM 11 (which is the same as the first address of the addresses assigned to the EPROM 12) is sent to the address decoder 21, the flash EEPROM 11 and the EPROM 12 from the CPU 10 through the address bus thereafter (at the time point t2).

In this case, the read/write signal R/W is at a level "H" at which the read instruction is indicated.

Consequently, the ROM designation signal ENROM from the address decoder 21 is reversed to enter a high level. The ROM designation signal ENROM is returned to the low level after it is maintained at the high level for a predetermined time period. While the ROM designation signal ENROM is reversed to enter the high level and the high level is maintained, the output of the NAND circuit 45 is brought into a low level, so that the flash EEPROM designation signal /FLASHSEL which is the output of the AND circuit 48 is brought into an active level "L" and the level is maintained. That is the flash EEPROM 11 is designated. The data input instruction or the data output instruction for the input-output device which is not actually used, which is stored in the first area of the flash EEPROM 11, is read out, and an address signal for designating addresses assigned to the input-output device is sent to the address decoder 21 through the address bus (at the time point t3).

Consequently, the rewrite processing inhibition signal DISROM, which is the signal output from the address decoder 21 for designating the input-output device, is reversed to enter a high level. The rewrite processing inhibition signal DISROM is maintained at the high level for a predetermined time period and then is returned to a low level. If the rewrite processing inhibition signal DISROM is reversed to the high level, the D input signal of the D-type flip-flop 53 is brought into a high level, so that the D input signal at the high level is read at the timing of the succeeding rise of the clock SYSCLK (at the time point t4). Accordingly, the Q output of the D-type flip-flop 53 is brought into a high level, and the /Q output thereof is reversed to enter a low level. This Q output is fed back to the D input terminal of the D-type flip-flop 53. Even if the rewrite processing inhibition signal DISROM is brought into the low level thereafter, therefore, the /Q output is maintained at the low level.

If the /Q output of the D-type flip-flop 53 is reversed to enter the low level, the output signal /CL of the OR circuit 51 is brought into an active level "L", so that the D-type flip-flop 32 is cleared. Even if the rewrite mode selecting switch 24 is erroneously turned on thereafter, therefore, the mode distinction signal ROMSEL which is the Q output of the D-type flip-flop 32 is not brought into a high level, and the EPROM designation signal /EPROMSEL is not brought into an active level "L". Even if the operator erroneously turns the rewrite mode selecting switch 24 on while the normal processing mode is being executed, therefore, the rewriting program is not executed.

From the time point t4 on, every time addresses assigned to the flash EEPROM 11 or the EPROM 12 are designated so that the ROM designation signal ENROM is brought into the high level, the flash EEPROM designation signal /FLASHSEL is brought into the active level "L", so that the basic program is read out from the flash EEPROM 11, to perform the normal processing based on the basic program.

Figure 4:
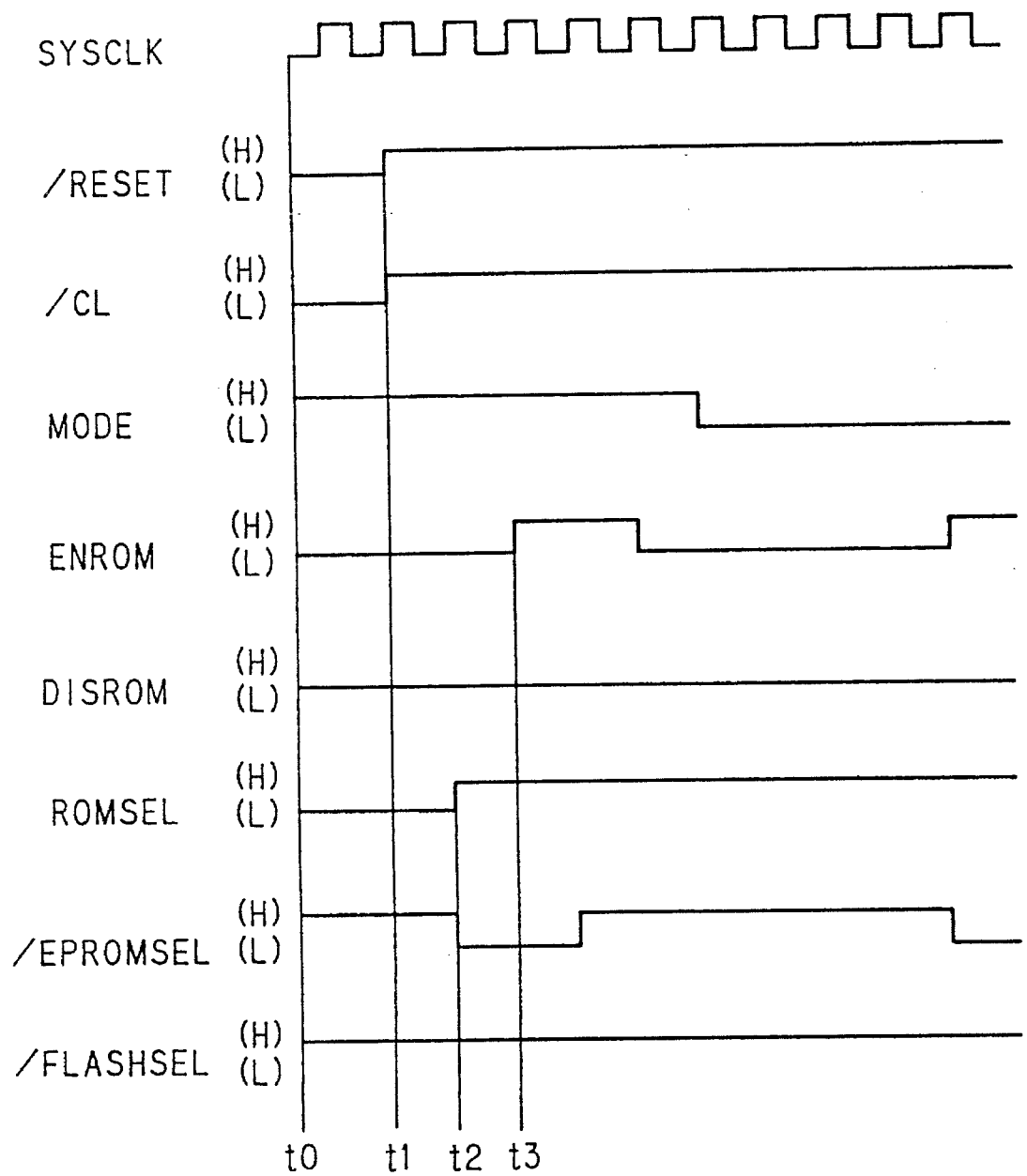
FIG. 4 is a timing chart showing signals in the respective portions shown in FIG. 2 in a rewrite processing mode.

FIG. 4 shows signals in the respective portions shown in FIG. 2 in the rewrite processing mode.

Referring to FIGS. 1, 2 and 4, description is made of an operation in the rewrite processing mode.

When the rewrite processing mode is selected, an operator turns the system power supply on in a state where the rewrite mode selecting switch 24 is turned on. Consequently, in the rewrite processing mode, when the system power supply is turned on (at the time point t0), the rewrite mode selecting switch 24 is on, so that the mode selection signal MODE is at a high level. Consequently, the output of the OR circuit 31, that is, the D input of the D-type flip-flop 32 is brought into a high level.

Since the reset signal /RESET from the reset signal generator 23 is at a low level, however, the input signal to the clear input terminal CL of each of the D-type flip-flops 32 and 53 is brought into a low level. Accordingly, each of the D-type flip-flops 32 and 53 is cleared, so that the Q output is brought into a low level and the /Q output is brought into a high level.

Furthermore, since the ROM designation signal ENROM is at a low level, both the EPROM designation signal /EPROMSEL and the flash EEPROM designation signal /FLASHSEL are at an inactive level "H".

When a predetermined time period has elapsed after the system power supply is turned on (at the time point t1), the reset signal /RESET from the reset signal generator 23 is reversed to enter an inactive level "H" and thereafter, this level is maintained. Consequently, the clear signal /CL which is the output of the OR circuit 51 is reversed to enter a high level, so that the cleared state of the D-type flip-flop 32 is released. In addition, the input signal to the clear input terminal CL of the D-type flip-flop 53 is brought into a high level, so that the cleared state of the D-type flip-flop 53 is released.

When the cleared state of the D-type flip-flop 32 is released, the signal at the high level which is input to the D input terminal of the D-type flip-flop 32 is read at the time of the succeeding rise of the clock signal SYSCLK (at the time point t2), so that the mode distinction signal ROMSEL which is the 0 output of the D-type flip-flop 32 is reversed to enter a high level. The mode distinction signal ROMSEL is fed back to the OR circuit 31. Even if the rewrite mode selecting switch 24 is turned off thereafter, therefore, the mode distinction signal ROMSEL which is the Q output of the D-type flip-flop 32 is maintained at the high level.

When the reset signal /RESET is reversed to enter the inactive level "H" so that reset is released at the above described time point t1, an address signal for designating the first address of the addresses assigned to the flash EEPROM (which is the same as the first address of the addresses assigned to the EPROM 12) is sent to the address decoder 21, the flash EEPROM 11 and the EPROM 12 from the CPU 10 through the address bus thereafter (at the time point t3). In this case, the read/write signal R/W is at a level "H" at which the read instruction is indicated.

Consequently, the ROM designation signal ENROM from the address decoder 21 is reversed to enter a high level. The ROM designation signal ENROM is returned to the low level after it is maintained at the high level for a predetermined time period. While the ROM designation signal ENROM is reversed to enter the high level and the high level is maintained, the output of the NAND circuit 44 is brought into a low level, so that the EPROM designation signal /EPROMSEL which is the output of the AND circuit 47 is brought into an active level "L" and the level is maintained. That is, the EPROM 12 is designated. The instruction stored in the first area of the EPROM 12, that is, a first instruction of the rewriting program is read out, to start the rewrite processing.

In this case, the rewrite processing inhibition signal DISROM is not brought into an active level "H", unlike the normal processing mode. Consequently, the /Q output of the D-type flip-flop 53 is always maintained at the high level. As a result, after the reset signal /RESET is reversed to enter the inactive level "H", the clear signal /CL which is input to the clear input terminal CL of the D-type flip-flop 32 is maintained at an inactive level "H".

From the time point t3 on, when an address signal for designating the ROMs 11 and 12 is output from the CPU 10 so that the ROM designation signal ENROM is brought into the high level, the EPROM designation signal /EPROMSEL is brought into the active level "L" in the case of the read instruction (the read/write signal R/W is at a level "H"), so that the rewriting program is read out from the EPROM 12, to perform rewrite processing based on the rewriting program.

From the time point t3 on, when data is written to the flash EEPROM 11 on the basis of the rewriting program, an address signal for designating the ROMs 11 and 12 is output from the CPU 10, and the write instruction (the read/write signal R/W is at a level "L") is output. In this case, the EPROM designation signal /EPROMSEL which is the output of the AND circuit 47 is brought into the inactive level "H", so that the EPROM 12 is not designated. On the other hand, the output of the NAND circuit 46 is brought into a low level, so that the flash EEPROM designation signal /FLASHSEL, which is the output of the AND circuit 48, is brought into an active level "L", so that the flash EEPROM 11 is designated. As a result, data is written to the flash EEPROM 11.

According to the above described embodiment, the same addresses are assigned to the flash EEPROM 11 storing the basic program and the EPROM 12 storing the rewriting program for rewriting the contents of the flash EEPROM 11. Accordingly, even if the EPROM 12 storing the rewriting program is provided, the memory area which may be designated by the CPU 10 is not narrowed.

Furthermore, when the power supply is turned off while the rewrite processing is being executed, the power supply is turned back on in a state where the rewrite mode selecting switch 24 is turned on to perform the rewrite processing again from the beginning, thereby making it possible to rewrite the basic program from the beginning without running an incomplete basic program. Consequently, it is possible to subsequently operate the system normally.

Although in the above described embodiment, the same addresses are assigned to the flash EEPROM 11 storing the basic program and the EPROM 12 storing the rewriting program for rewriting the contents of the flash EEPROM 11, different addresses may be assigned to the flash EEPROM 11 and the EPROM 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory designation control device comprising:
   a first rewritable memory device for storing a basic program;
   a second memory device, different from said first memory device, for storing a rewriting program for rewriting the contents of said first memory device;
   a mode selecting switch for switching between a normal processing mode in which normal processing based on the basic program is performed, and a rewrite processing mode in which rewrite processing based on the rewriting program is performed;
   means for bringing only said first memory device, out of said first memory device and said second memory device, into a selectable state when a system power supply is turned on while the mode selecting switch is in a state where the normal processing mode is selected;

means for bringing only said second memory device, out of said first memory device and said second memory device, into a selectable state at the time of a read instruction, while bringing only said first memory device, out of said first memory device and said second memory device, into a selectable state at the time of a write instruction, when a system power supply is turned on while said mode selecting switch is in a state where the rewrite processing mode is selected; and means for inhibiting, when a system power supply is turned on while said mode selecting switch is in the state where the normal processing mode is selected, said second memory device from being brought into a selectable state if said mode selecting switch is switched to the state where the rewrite processing mode is selected after a system power supply is turned on.

2. The memory designation control device according to claim 1, wherein said first memory device is a flash electrically erasable programmable read only memory.

3. The memory designation control device according to claim 1, wherein said first memory device is an electrically erasable programmable read only memory.

4. The memory designation control device according to claim 1, wherein said second memory device is an erasable programmable read only memory.

5. The memory designation control device according to claim 1, wherein the same addresses as those assigned to said first memory device are assigned to said second memory device.

* * * * *